United States Patent
Fell et al.

(10) Patent No.: US 11,939,897 B2
(45) Date of Patent: Mar. 26, 2024

(54) AUTONOMOUS AUXILIARY DEF SUPPLY SYSTEM WITH PURGE CONTROL

(71) Applicant: Multiquip, Inc., Cypress, CA (US)

(72) Inventors: George Fell, Norwalk, CA (US); Patrick Joseph Weaver, Anaheim, CA (US)

(73) Assignee: Multiquip Inc., Cypress, CA (US)

( * ) Notice: Subject to any disclaimer, the term of this patent is extended or adjusted under 35 U.S.C. 154(b) by 0 days.

(21) Appl. No.: 18/089,286

(22) Filed: Dec. 27, 2022

(65) Prior Publication Data
US 2023/0212974 A1    Jul. 6, 2023

Related U.S. Application Data

(63) Continuation of application No. 17/063,238, filed on Oct. 5, 2020, now Pat. No. 11,536,186, which is a (Continued)

(51) Int. Cl.
*F01N 13/00* (2010.01)
*F01N 3/20* (2006.01)
*F01N 9/00* (2006.01)

(52) U.S. Cl.
CPC ........... *F01N 13/002* (2013.01); *F01N 3/206* (2013.01); *F01N 3/2066* (2013.01); *F01N 3/208* (2013.01); *F01N 9/005* (2013.01); *F01N 2590/10* (2013.01); *F01N 2610/02* (2013.01); *F01N 2610/1406* (2013.01); *F01N 2610/1413* (2013.01); *F01N 2610/142* (2013.01); (Continued)

(58) Field of Classification Search
CPC ........ F01N 3/206; F01N 3/2066; F01N 3/208; F01N 13/002; F01N 2590/10; F01N 2610/02; F01N 2610/1406; F01N 2610/1413; F01N 2610/142; F01N 2610/144; F01N 2610/1493; F01N 2900/1811; F01N 2900/1814
See application file for complete search history.

(56) References Cited

U.S. PATENT DOCUMENTS 10,344,651 B1    7/2019   Sanghavi et al.
2010/0037599 A1  2/2010   Toshioka et al.
(Continued)

OTHER PUBLICATIONS

Cummins Generator Set Owner's Manual, dated 2016.
Section 7.8 of Cummins Service Manual, dated 2017, pp. 243-260.

*Primary Examiner* — Audrey B. Walter
(74) *Attorney, Agent, or Firm* — Burdick Patents, P.A.; Sean D. Burdick; Colin L. Honan

(57) ABSTRACT

An auxiliary system with purge control automatically supplies diesel exhaust fluid (DEF) to an onboard DEF tank of a diesel engine to enable prolonged unattended operation. The system includes an auxiliary DEF tank, an auxiliary DEF supply line, a controller, a pump, an air inlet, and a three-way valve configured to switch the pump inlet between the auxiliary DEF tank and air. In response to low-level DEF, the pump delivers DEF through the supply line to replenish the onboard DEF tank. The controller may automatically calculate onboard DEF tank volume based on the delivered volume of DEF, and DEF level data received from an ECM, to enable replenishment control regardless of engine make and model. In response to high-level DEF, engine stoppage, or other system fault, the controller switches the valve to air and runs the pump for a predetermined time to purge DEF from the supply line.

20 Claims, 5 Drawing Sheets

Related U.S. Application Data continuation of application No. 16/048,264, filed on Jul. 28, 2018, now Pat. No. 10,794,257.

(52) U.S. Cl.
CPC .................. *F01N 2610/144* (2013.01); *F01N 2610/1493* (2013.01); *F01N 2900/1811* (2013.01); *F01N 2900/1814* (2013.01)

(56) References Cited

U.S. PATENT DOCUMENTS

| | | |
|---|---|---|
| 2010/0319321 A1 | 12/2010 | Kamiya et al. |
| 2012/0031073 A1 | 2/2012 | Gräter |
| 2013/0186509 A1 | 7/2013 | Wright et al. |
| 2014/0352280 A1 | 12/2014 | Qi et al. |
| 2015/0300228 A1 | 10/2015 | Gong et al. |
| 2016/0160731 A1 | 6/2016 | Turbak et al. |
| 2018/0293819 A1 | 10/2018 | Ross |

AUTONOMOUS AUXILIARY DEF SUPPLY SYSTEM WITH PURGE CONTROL

CLAIM OF PRIORITY

This application is a continuation of U.S. application Ser. No. 17/063,238 filed on Oct. 5, 2020, issued as U.S. Pat. No. 11,536,186 on Dec. 27, 2022, which is a continuation of U.S. Application 16/048,264, filed on Jul. 28, 2018, issued as U.S. Pat. No. 10,794,457 on Oct. 6, 2020, both of which are fully incorporated herein by reference.

BACKGROUND OF THE INVENTION

Field of the Invention

The present invention relates generally to systems for supplying diesel exhaust fluid (DEF) to diesel engines, and more specifically to an automated control system for supplying DEF from an auxiliary tank to enable remote, unattended operation of a diesel engine for extended periods of time.

Description of Related Art

Diesel engines, whether used to power vehicles, generators, pumps, or compressors, etc. are subject to environmental standards (e.g. Tier 4 Final) that now mandate widespread use of selective catalytic reduction (SCR) technology to reduce harmful nitrogen oxide (NOX) emissions. SCR technology injects a urea-based DEF into the exhaust system of a diesel generator upstream of a catalyst, where it vaporizes and decomposes to form ammonia and carbon dioxide. The ammonia and catalyst react with NOX, converting it to harmless nitrogen and water.

For standards compliance, DEF supply systems in diesel engines include an onboard DEF tank and controls necessary for causing injection of the DEF into the exhaust system when the engine is running. Diesel engine manufacturers must provide engine control modules (ECMs) that are programmed to automatically shut down the engine, or reduce engine power, in the event that DEF level or DEF quality drop below acceptable levels. Timely replenishment of the DEF therefore becomes critical, and so diesel engine operators must refill the onboard DEF tank manually, usually when adding fuel, to replenish DEF that is consumed during normal operation. Operators of diesel-powered vehicles such as trucks and tractors are able to maintain an operable level of DEF without difficulty, by topping off the onboard DEF tank during a refueling stop, or by carrying a refill supply on board for emergency use. Operators of diesel generators can similarly replenish the onboard DEF tank, provided that an operator is on duty and able to monitor DEF tank level.

Other problems arise, however, when deploying diesel engines in applications that require automatic unattended operation. For example, diesel engines are often run in locations remote from an electrical grid to drive stationary apparatus, such as electrical generators, pumps, and air compressors. These applications may require that the diesel engine run unattended for extended periods of time during which diesel fuel and DEF are continuously consumed. Although extended operation relies equally on timely replenishment of both diesel fuel and DEF, in practice diesel fuel supplies are generally more readily available to remote locations than are DEF supplies, due to supply and demand logistics. Periodic replenishment of the DEF tank can therefore become a critical path impediment to ensuring compliance with Tier-4 Final (and future) standards for unattended operation of diesel engines for extended periods of time.

U.S. Patent Application Publication 2016/0160731 (Turbak et al.) proposes a solution to this problem by providing, for a diesel generator set, both an onboard DEF tank and an auxiliary DEF supply system. The overall system relies on a generator control module, integral to the diesel generator set, to sense DEF level in the onboard DEF tank. When the sensed DEF level is low, the generator control module actuates a pump located in the auxiliary DEF supply system to transfer DEF from a bulk storage tank to the onboard DEF tank via an auxiliary DEF hose.

The proposed solution of Turbak et al. suffers from several impracticalities and leaves other problems unaddressed. For one, DEF replenishment is controlled by an engine/generator controller that receives information from an engine control module (ECM). These control modules are customized by the OEM of the diesel generator for use with its particular diesel generator set. Thus, the auxiliary DEF supply system lacks independent controls, functions only as a slave to the ECM, and is not designed to interface universally with diesel engines made by other manufacturers. Another problem introduced by this system can occur in the auxiliary DEF hose that carries DEF from the bulk storage tank to the onboard DEF tank. During time periods when the engine is off and no DEF circulates from auxiliary DEF supply system to the onboard DEF tank, the volume of DEF remaining in the DEF hose can be exposed to temperature extremes for long periods of time and this can adversely affect operation. For example, DEF will freeze at about 12 degrees F. Should DEF become frozen in the hose, the auxiliary DEF line may clog and cause a system shutdown. At temperatures above 90 degrees F., the quality of the DEF will begin to degrade and discolor. Discoloration of DEF can trigger a low-quality alarm, leading to SCR malfunction or system shut-down.

What is needed to support prolonged, unattended operation of diesel engines is an auxiliary DEF system with independent local controls that is capable of interfacing with any make and model of engine and that can operate autonomously to replenish DEF from an auxiliary tank without compromising DEF quality.

SUMMARY OF THE INVENTION

To address the foregoing problems, the present invention discloses an auxiliary system that automatically supplies DEF to an onboard DEF tank of a diesel engine to enable prolonged unattended operation. A system according to the invention operates autonomously by means of a dedicated local controller that is configured for universal cooperation with ECMs of any make and model of diesel engine. In addition, the invention provides a scheme for automatically purging the DEF from an auxiliary DEF supply line under various operating conditions.

In one embodiment, an auxiliary DEF supply system according to the invention includes an auxiliary DEF tank, and an auxiliary DEF supply line configured for fluid communication between the auxiliary DEF tank and an onboard DEF tank of a diesel engine. Also provided are a pump, an air inlet, and a three-way valve. The pump is configured to force fluid (ambient air or DEF) from a pump inlet through the auxiliary DEF supply line. The three-way valve is configured to switch between a first state, which couples the auxiliary DEF tank to the pump inlet, and a second state, which couples the air inlet to the pump inlet.

In one configuration of the system, the three-way valve when non-energized remains in the first state.

A system according to the invention may further include a controller electrically coupled to the pump and configured to receive a supply signal and to command the pump to start in response to receiving the supply signal. For example, the supply signal may represent low DEF level in the onboard DEF tank. The controller may also be electrically coupled to the three-way valve and configured to receive a purge signal. In response to receiving the purge signal, the controller may command the three-way valve to switch to the second state, and command the pump to stop when a predetermined time period has lapsed after receiving the purge signal. The predetermined time period is designed to be sufficient to allow the pump to displace the DEF in the auxiliary DEF supply line with air. Accordingly, in the second state, the pump will force air into the auxiliary DEF supply line until the supply line is purged of DEF.

The purge signal may be programmed to represent an off state of the diesel engine, a shutdown command for the diesel engine, a high DEF level in the onboard DEF tank, or the occurrence of another operating state or condition. Signals such as the supply and purge signals may be received by the controller of the auxiliary DEF supply system from an ECM of the diesel engine via CAN bus protocol. In another embodiment, the controller, in response to receiving the purge signal, may command the three-way valve to switch to the first state after the predetermined time period has lapsed.

In another embodiment, a single auxiliary DEF supply system according to the invention is configured for servicing multiple diesel engines. This system is equipped with multiple component trains, wherein each component train includes a pump, an air inlet, a three-way valve, and an auxiliary DEF supply line—one component train for each engine to be serviced from a common auxiliary DEF tank by a common controller.

In a more elaborate embodiment of the invention, the auxiliary DEF supply system includes a controller and a portable enclosure, wherein the controller is configured for communicating via CAN bus protocol, and wherein the portable enclosure contains the controller, the auxiliary DEF tank, the pump, the air inlet, the three-way valve, and at least part of the auxiliary DEF supply line. The enclosure may further include a means for heating or cooling the auxiliary DEF tank.

In another embodiment of the invention, an autonomous auxiliary DEF supply system for supplying DEF to an onboard DEF tank in a diesel engine includes the following components: an auxiliary DEF tank, an auxiliary DEF supply line configured for fluid communication between the auxiliary DEF tank and the onboard DEF tank, a pump configured to force DEF through the auxiliary DEF supply line, and a controller electrically coupled to the pump. According to the invention, the controller is configured to command the pump responsive to DEF level signals received from an engine control module of the diesel engine. In one implementation, the DEF level signals are generated according to CAN bus protocol.

In this embodiment the controller is configured to execute a routine encoded in software for calculating onboard DEF tank volume. In one implementation, the routine executable by the controller effects the following steps: receiving a low DEF level signal from the engine control module that indicates a low level of DEF in the onboard DEF tank, running the pump for a single fill cycle selected to deliver to the onboard DEF tank a volume of DEF that is less than a total volume of the onboard DEF tank, receiving an actual DEF level signal from the engine control module that indicates a higher level of DEF in the onboard DEF tank, and calculating the total volume of the onboard DEF tank based on the low level of DEF, the delivered volume of DEF, and the higher level of DEF. In another implementation, the controller may effect an additional step for determining a number of the fill cycles that will deliver a maximum volume of DEF to the onboard DEF tank without exceeding the total volume.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

DETAILED DESCRIPTION OF THE INVENTION

The following disclosure presents exemplary embodiments for an auxiliary system that automatically supplies DEF to an onboard DEF tank of a diesel engine to enable prolonged unattended operation. A system according to the invention operates autonomously by means of a dedicated local controller that is configured for universal cooperation with ECMs of any make and model of diesel engine. In addition, the invention provides a scheme for automatically purging the DEF from an auxiliary DEF supply line under various operating conditions.

Diesel engines, often being stationary apparatus, present the opportunity to engineer an independent, portable system for providing an auxiliary service that is common to a wide variety of engines. While modern diesel engines, e.g. those that satisfy Tier 3 and Tier 4 Final emission control standards, are equipped with ECMs that may be individually modified to effect the control schemes disclosed herein, the variation in ECM functionality among diesel engine makes and models renders the ECM undesirable for use as a controller in a universal auxiliary DEF supply system. It is therefore an objective of the present invention to provide an independent controller for the auxiliary system that interfaces physically and functionally with features that all modern diesel engine control systems have in common. In particular, diesel engines qualified to the Tier 4 Final (and certain other) emissions control standard all utilize the CAN bus protocol to command the SCR system. CAN bus signals are used, for example, to monitor DEF parameters, to effect DEF level control and injection, and to satisfy EPA mandates for shutting down the engine via the ECM in response to sensing low DEF levels or low DEF quality. An auxiliary DEF supply system according to the invention exploits common features of diesel engine systems by providing an independent controller capable of executing specialized software instructions that interface with any ECM via known signal protocol to supply DEF from an auxiliary tank when needed to support prolonged periods of operation. By reading certain signals from an ECM in this manner, the auxiliary DEF supply system can sense conditions such as low DEF, and in response turn on an auxiliary DEF pump, fill an onboard DEF tank from an auxiliary DEF tank, and then shut down the pump and purge the supply line. A further objective of the invention is to provide this functionality to multiple diesel generators served from a single auxiliary DEF supply system.

Figure 1:
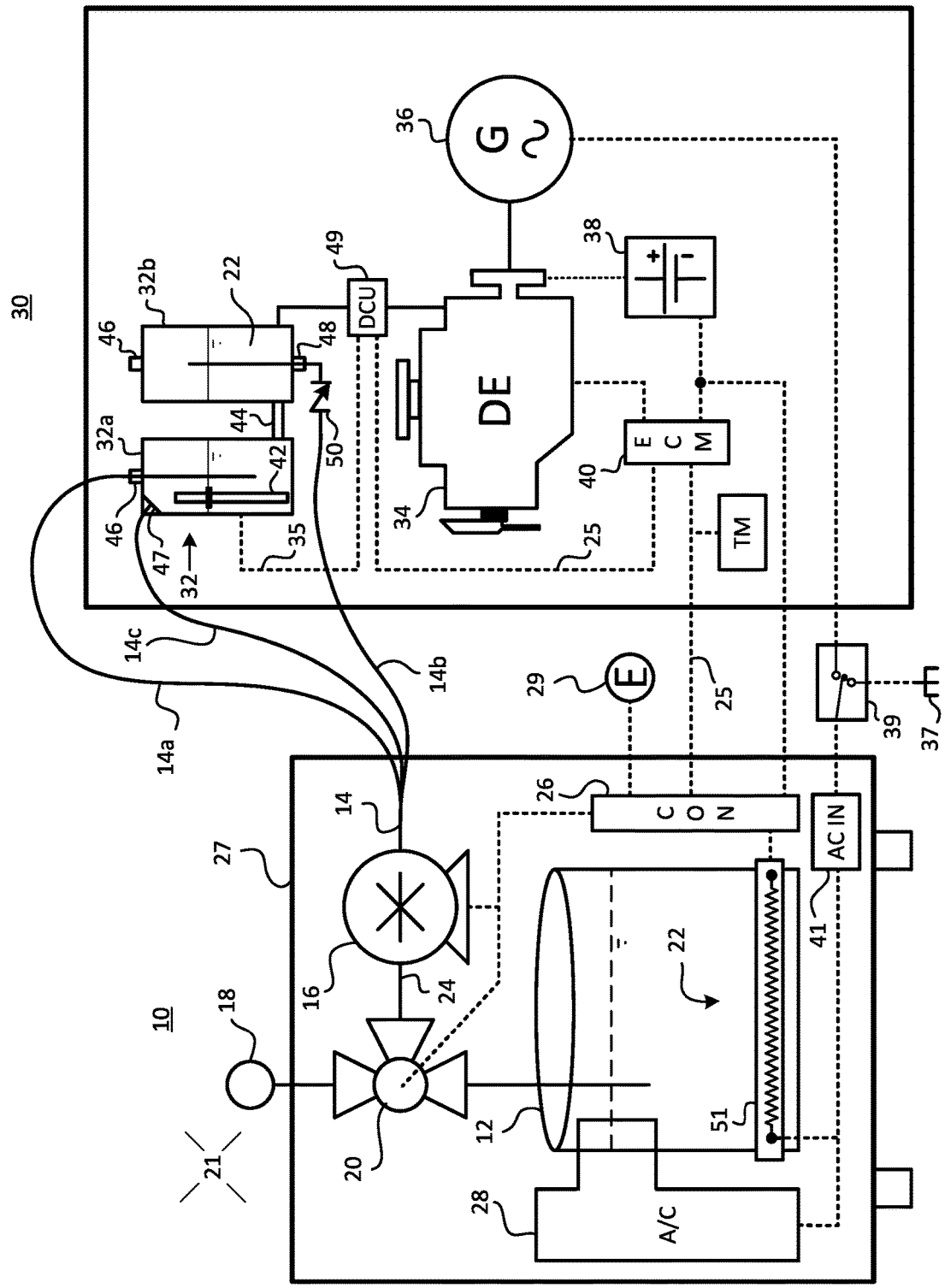
FIG. 1 is a block diagram of one embodiment of an auxiliary DEF supply system according to the invention, coupled to a diesel engine generator set.

FIG. 1 shows a block diagram of one embodiment of an auxiliary DEF supply system 10 according to the invention, coupled to a diesel engine generator set 30. In the diagram, dashed lines indicate electrical connections for power and control signals, while solid lines indicate mechanical structure or coupling. In this embodiment, the auxiliary DEF supply system 10 includes an auxiliary DEF tank 12, an auxiliary DEF supply line 14, a pump 16, and air inlet 18, and a three-way valve 20. Auxiliary DEF tank 12 is shown partially filled with a quantity of DEF 22. In one embodiment, tank 12 may be of stainless steel or thermoplastic construction, and have a capacity of about 100 gallons.

A microprocessor controller 26 is mounted locally on system 10, and is electrically coupled to control actuation of pump 16, valve 20, and an optional cooling means 28. In one embodiment, a Parker model MC42 may be used as microprocessor controller 26. The cooling means 28 may be a fluid chiller unit or electric fan configured to cool the auxiliary DEF tank 12 and its contents, e.g. in a conventional manner in response to high temperature sensed by a temperature sensor (not shown). A heating means 51 may be a heating element or an insulated blanket with electric heat trace, and may be powered from a source of external AC power coupled to an AC inlet receptacle 41 that is mounted to the enclosure 27. A switch or other power connector 39 may be provided to allow the external AC power to be conveniently connected to either generator 36 or to utility power 37. The heating means 51 may also include a hose with an integral heating element. Operation of the heating element 51 may be controlled by the controller 26 in response to sensing low temperature from the temperature sensor.

In a preferred embodiment, the pump 16 is configured to force fluid (ambient air 21 or DEF 22) from a pump inlet 24 through the auxiliary DEF supply line 14. A Shurflo® model 8000-253-250 diaphragm pump is one example of a pump suitable for this purpose. The three-way valve 20 is configured to switch between a first state which couples the auxiliary DEF tank 12 to the pump inlet 24, and a second state which couples the air inlet 18 to the pump inlet 24. An Assured Automation™ model B33DAXV4F valve is one example of a three-way valve that is suitable for this purpose. In one configuration of the system 10, the three-way valve 20 when non-energized remains in the first state, so that during normal operation, as described in greater detail below, the system 10 is in a ready condition to pump DEF 22 from the auxiliary DEF tank 12 through the auxiliary DEF supply line 14 to supply or replenish another DEF tank, such as one that is mounted onboard a diesel engine.

System 10 is shown in a state of use. In this example, system 10 is coupled electrically and mechanically to a diesel engine and generator set (DEG) 30. In other applications, system 10 may be coupled to multiple diesel engines, including for example, engine-generators that provide power to different independent loads, or for a paired set of generators powering a common load, or which may be redundant generators providing a source of emergency backup power for a processing plant. In other applications, system 10 may be coupled to one or more diesel engines that serve as prime movers for pumps, air compressors, or other non-electrical apparatus.

Diesel engine 34 of DEG 30 represents a fully assembled apparatus that is commercially available from any of a number of manufacturers such as Cummins®, Ford®, John Deere®, Isuzu®, Volvo®, etc. While such apparatus include hundreds of components, only a few are shown in the figure and these are exaggerated for purposes of illustrating salient features of the present invention. For example, onboard DEF tank 32, DC battery 38, and ECM 40 appear as separate components but are typically integral to the system of diesel engine 34. Electrical generator 36 of DEG 30 also represents a fully assembled apparatus, and may be provided separately from diesel engine 34, or as an integral part of DEG 30.

The auxiliary DEF supply line 14 mechanically connects system 10 to system 30. Supply line 14 is configured to maintain fluid communication between the auxiliary DEF tank 12 and the onboard DEF tank 32. In one embodiment, supply line 14 may be a ⅜ inch inside diameter hose made of a flexible material such as synthetic rubber and having a nominal length of about 25 feet. Other sizes, lengths, and materials for supply line 14 are possible within the scope of the invention. Onboard DEF tank 32 provides a source of DEF to diesel engine (DE) 34. The diesel engine 34 is mechanically coupled to the electrical generator (G) 36. DC battery 38 is electrically coupled to the diesel engine 34 in a conventional manner to store energy for purposes of starting the engine, and to be recharged by an alternator when the engine is running. The battery 38 may provide electrical power to ECM 40. For signal communications, ECM 40 is also electrically coupled to the engine 34 and to a dosing control unit (DCU) 49. The DCU 49 is an OEM device that controls injection of DEF into the exhaust system of the diesel engine 34 in response to receiving data representing certain conditions as described herein, such as the engine 34 running. DCU 49 is electrically coupled to a DEF sensor 42 installed within the onboard DEF tank 32. The DEF sensor 42 is configured to sense DEF level or DEF quality (or both) in the onboard DEF tank 32. Generally, the DCU 49 receives CAN data from DEF tank 32 via a private CAN bus 35 and relays that information to the ECM 40 via public CAN bus 25. Signals transmitted to or from DCU 49 may govern purging of the DEF lines 14 after the engine 34 is stopped.

Onboard DEF tank 32 may be a single tank 32a or 32b, or for purposes of illustration it may represent multiple DEF tanks that are configured in fluid communication, such as DEF tank 32a and DEF tank 32b connected together by an equalizing line 44. DEF tank 32a represents a tank style common in certain diesel engine models that has an upper port 46 at the top of the tank. DEF tank 32b represents a tank style common in certain other diesel engine models that has a port 48 at the bottom of the tank. These ports, however, may already be plumbed for other purposes, such as injecting the DEF into the SCR system. According to the invention, connecting auxiliary DEF supply line 14 to the onboard DEF tank 32 may require a modification to allow for coupling of the auxiliary DEF supply line 14. But the onboard DEF tank, being an essential component in an environmentally qualified SCR system, cannot normally be modified without disqualifying the system configuration. An auxiliary system according to the invention must therefore connect via an auxiliary fill cap port 47 or an existing port—either through a port 46 or a port 48—that is not already dedicated for another purpose. In some cases, where onboard DEF tank 32 comprises multiple tanks 32a and 32b in fluid communication, one of the ports 46 may be rendered redundant and not used. In that case, the auxiliary DEF supply line 14 may take the path of supply line 14a and connect to a port 46. In other cases, where the port 48 merely serves as a drain plug for maintenance purposes, the auxiliary DEF supply line 14 may take the path of supply line 14b and connect to the port 48. In other cases, the auxiliary DEF supply line 14 may take the path of supply line 14c and connect to an auxiliary fill cap with port 47. Note that the three possible paths, 14a, 14b and 14c, for the auxiliary DEF supply line 14 are alternative paths that are superimposed in FIG. 1 for purposes of illustration only. An auxiliary DEF supply system according to the invention needs only one such supply line to the onboard DEF tank. At or near the end of supply line 14b, an optional check valve 50 may be installed, as shown, to prevent backflow of DEF due to hydrostatic pressure. In one embodiment, a Legris® 48951818 model valve may be used as check valve 50.

System 10 and system 30 are electrically connected between the controller 26 and ECM 40. In one embodiment, controller 26, and other components of system 10 electrically coupled to controller 26, may receive DC power via the connection to ECM 40. In another embodiment, the controller 26 and the other system 10 components may be powered by direct connection to generator 36. On a signal level, electrical coupling between controller 26 and ECM 40 allows controller 26 to read or receive control signals transmitted by ECM 40 that are commonly required in any diesel engine system that is qualified to the environmental standards referenced herein. Such signals include DEF level and DEF quality in the onboard DEF tank 32. Controller 26 may also read any other signal generated by ECM 40, such as the state of an engine ignition switch, the running state of the engine 34 (on or off), the voltage output of battery 38, and an engine fault signal. In response to receiving ECM signals, the controller 26 may be programmed to generate one or more actuation signals to pump 16 or to valve 20 to supply DEF 22 to the onboard DEF tank 32 or to purge DEF 22 from the auxiliary DEF supply line 14. For example, the controller 26 may be programmed to monitor the ECM 40 for certain CAN bus signals known to represent DEF level in the onboard DEF tank 32. John Deere and Cummins ECMs are known to broadcast DEF level using the standard J1939 SAE PGN 65110 (FE5 Hex). Isuzu ECMs, however, are known to broadcast DEF level using a proprietary PGN 65512 (FFE8 Hex). According to the invention, controller 26 may be programmed to monitor the ECM first for 0xFE56, and if no data is detected after a timeout period has lapsed, begin monitoring instead for 0xFFE8 as a source for the DEF level data. In this manner, controller 26 may be programmed to read CAN bus signals that use different message formats to communicate similar data.

A telematics (TM) device 43 may be configured to receive CAN data via public CAN bus 25 to enable one form of remote monitoring of system 30. TM 43 received the CAN data and broadcasts relevant information wirelessly, e.g. using cellular protocol, based on the telematics programming and end user needs.

According to the foregoing system configuration, an auxiliary DEF supply system 10 through its controller 26 may read a low DEF signal broadcast by ECM 40, and interpret the data received as a "supply" signal, i.e. a signal indicating that the onboard DEF tank 32 needs to be replenished with DEF 22 from the auxiliary DEF tank 12. In response to receiving the supply signal, the controller 26 according to its programming issues a command signal to the pump 16 to start. The start command may be effected according to well-known control techniques, such as controller 26 changing voltage at an output pin from low to high to cause a power relay to change state and energize the terminals of the pump. With the three-way valve 20 in the first state, pump 16 delivers DEF 22 to the onboard DEF tank 32 via the supply line 14 to replenish the onboard volume of DEF.

The controller 26 may be electrically coupled in similar fashion for actuating the three-way valve 20. Other data read from the ECM by the controller, such as a high DEF signal, may be interpreted as a "purge" signal, i.e. a signal indicating that the onboard DEF tank 32 is full, and that the auxiliary DEF supply line 14 must be purged of residual DEF. In response to receiving the purge signal, the controller 26 may command the three-way valve 20 to switch to the second state, and command the pump 16 to stop when a predetermined time period has lapsed after receiving the purge signal. The predetermined time period should be sufficient to allow the pump 16 to displace the DEF in the auxiliary DEF supply line 14 with ambient air 21. Accordingly, in the second state, the pump 16 will force air into the auxiliary DEF supply line 14 until the supply line is purged of DEF. In another embodiment, the controller 26, in response to receiving a purge signal, may command the valve 20 to switch to the first state after the predetermined time period has lapsed. In other embodiments, the purge signal may represent an off state of the diesel engine 34, a shutdown command for the diesel engine 34, a high DEF level in the onboard DEF tank, or the occurrence of some other operating state or condition that warrants evacuation of DEF from the supply line 14.

In another embodiment of the invention, the auxiliary DEF supply system 10 includes a controller 26 and a portable enclosure 27, wherein the controller 26 is configured as previously disclosed, and wherein the portable enclosure 27 contains the controller 26, the auxiliary DEF tank 12, the pump 16, the air inlet 18, the three-way valve 20, and at least part of the auxiliary DEF supply line 14. The portable enclosure 27 may further include a heating means 51, such as an insulated blanket with electric heat trace. The portable enclosure 27 may further include a cooling means 28, such as fluid chilling unit or fan, for cooling the auxiliary DEF tank 12. The system 10 is configured for autonomous, unattended operation by programming the controller 26 for normal operation (described below) in which the controller continuously monitors ECM signals for low and high DEF levels, and in response, automatically cycles system 10 through supply and purge cycles. Barring any operating anomalies, such as engine faults or other component failures, system 10 can automatically replenish one or more systems 30 with DEF 22 until tank 12 is depleted of DEF or until the diesel engines run out of fuel. In another embodiment, a level sensor (not shown) may be installed in auxiliary DEF tank 12 to monitor the level of DEF 22 and transmit a level signal to the controller 26. Controller 26 may broadcast the DEF tank 12 level signal via public CAN Bus 25, to provide an operator located remotely from system 10 with the ability to monitor the state of the system. Other system conditions known to controller 26, such as onboard DEF tank level, running state of the diesel engine, fault signals output by the ECM, number of purge cycles run, etc. can be similarly transmitted via the public CAN Bus 25. Any of the signals transmitted by the ECM via the public CAN Bus 25 can also be output via Ethernet port 29 to a remote operator monitoring auxiliary system operation, or to a local PC that provides an operator interface for programming, setpoint adjustment, and system diagnostics.

In another embodiment of the invention, a single auxiliary DEF supply system 10 is configured for servicing multiple diesel engines 34 or DEGs 30. This system is equipped with multiple component trains, wherein each component train includes a pump 16, an air inlet 18, a three-way valve 20, and an auxiliary DEF supply line 14—i.e., one component train for each engine to be serviced from a common auxiliary DEF tank 12 by a common controller 26. In such an embodiment, the controller 26 is able to service, simultaneously and independently, diesel engines of different makes and models, wherein each engine is served in the same manner as described above as if it were the only engine coupled to the auxiliary DEF supply system.

Figure 2:
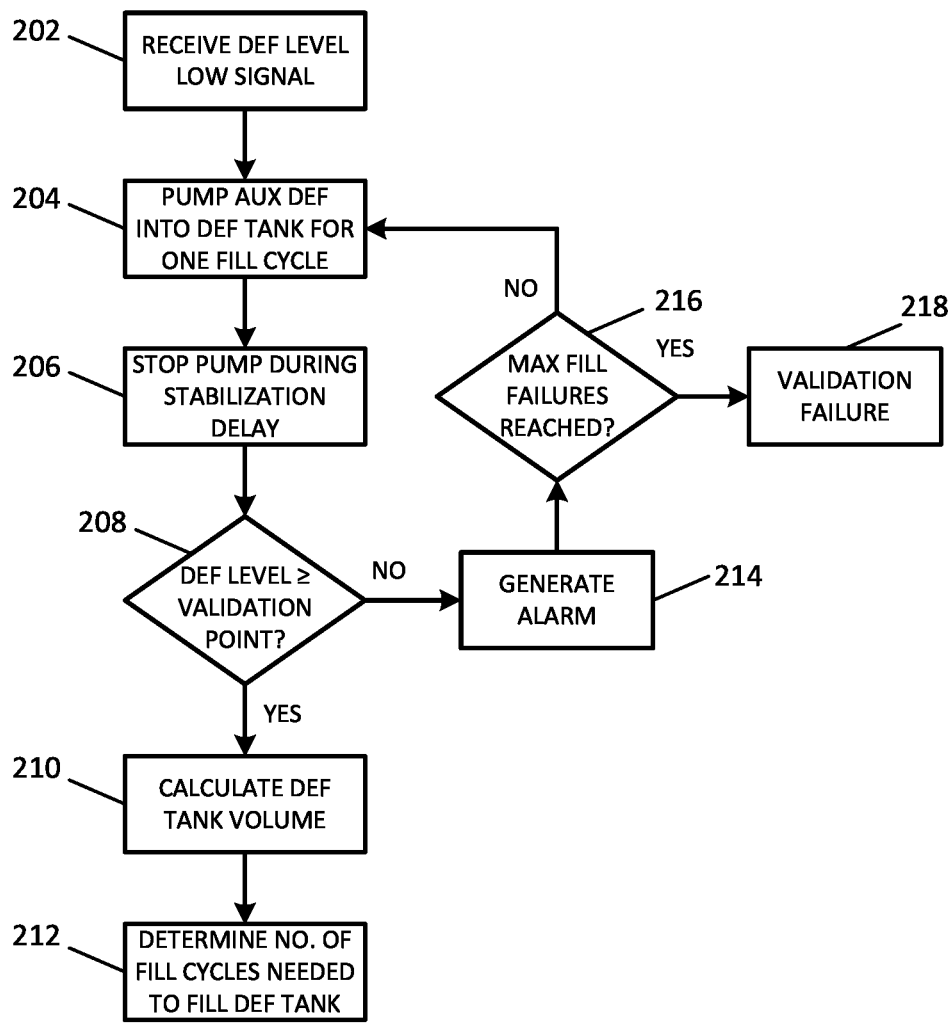
FIG. 2 is a flow chart of one embodiment of a process for a validation routine executable by an auxiliary DEF supply system according to the invention.

FIG. 2 shows a flow chart of one embodiment of a process for a validation routine 200 executable by an auxiliary DEF supply system 10 according to the invention as described in the foregoing paragraphs. Validation routine 200 may be performed upon first coupling system 10 to a diesel engine system 30 to allow for automatic determination of the volume of the onboard DEF tank 32. Once the volume is known, the system 10 can store in the memory of controller 26 data representing a number of "fill cycles" that are required for the pump 16 to deliver DEF 22 sufficient to fill the onboard DEF tank 32. A fill cycle is a time period, selected with knowledge of the flow rate of pump 16, during which the pump 16 will deliver enough DEF 22 to allow for detection of an acceptable rise in onboard DEF tank volume, but not so much DEF 22 as to overflow the smallest known volume of onboard DEF tank (e.g. 7.5 gal.) likely to be serviced by system 10. The validation routine gives system 10 the flexibility to interface universally with any make or model of diesel engine by adjusting the number of fill cycles required to fill any size of onboard DEF tank. The system 10 can therefore predict when the onboard DEF tank will become full, and initialize a purge cycle at that point in time, without being reliant on the accuracy of high DEF level signals received from ECM 40.

Validation routine 200 may be stored in software executable by the controller 26. The flow chart illustrates the salient steps of the routine. Validation routine 200 begins at step 202, at which controller 26 receives a low DEF level signal from ECM 40 that indicates a low level of DEF (usually 30% of capacity) in the onboard DEF tank 32. In response, in the next step 204, the controller 26 runs the pump 16 for one fill cycle to deliver to the onboard DEF tank a volume of DEF that is less than a total volume of the onboard DEF tank. In one embodiment, the volume of DEF delivered during the fill cycle is less than or equal to about 70% of tank capacity. For example, given a pump flow rate of 1 gpm, and a minimum onboard DEF tank volume of 7.5 gallons, the fill cycle time may be set to 225 seconds. This fill cycle will deliver about 3.75 gallons of DEF (or 40% of capacity) into the tank, bringing the total volume up to about 75%, which coincides with the typical setpoint for triggering a high level DEF signal. In the next step 206, the controller 26 may stop the pump 16 for the duration of a predetermined stabilization delay, to allow DEF tank volume to stabilize in case DEF tank 32 consists of multiple tanks (e.g. 32a, 32b) in fluid communication. In the next step 208, the controller 26 reads the measured level of DEF tank 32 as received from ECM 40, and determines whether the measured level has reached a minimum validation point, e.g. 32% of tank capacity. If it has, the process proceeds to step 210. At step 210, the controller 26 calculates the total volume of the onboard DEF tank based on the low level of DEF, the delivered volume of DEF, and the higher (or measured) level of DEF. In a final step 212, the controller determines a number of fill cycles required to deliver a maximum volume of DEF to the onboard DEF tank without exceeding the total volume, and stores the number in memory.

If, however, in step 208 the controller 26 determines that the measured level has failed to reach the validation point, e.g. 32% of tank capacity has not been reached, the process advances to step 214, in which an alarm is generated. The alarm may consist of illumination of an LED, generation of an audible tone, and/or broadcasting the failed attempt via public CAN Bus 25, e.g. J1939 CAN Bus. At the next step 216, the controller decides whether a maximum number of failed validation attempts has occurred, by comparing accumulated failures to a threshold value, e.g. three. If the maximum threshold has not been reached, the process loops back to step 204 to initiate another fill cycle. If, however, at step 216 the maximum threshold has been reached, the process logs a validation failure at step 218, and no further fill cycles are performed. A validation failure may indicate a problem or defect in the system, such as a leak, a clogged line, or a component failure. Once a validation failure is logged, the process may run a purge cycle, as in step 314 below.

In another embodiment of a validation routine, if at step 216 the maximum threshold for fill failures is reached, a fault light illuminates for the first time and refill routines for DEF tank 32 are locked out for the duration of the engine run period. If the engine 34 stops and is later started again, system 10 will reset the previous fault and restart its normal routines. To illustrate further, if for example the maximum number of fill failures is set at three: if a first fill failure occurs at step 214, an internal fault is generated and broadcast via public CAN bus 25, but the LED alarm is not illuminated. Later if a second fill failure occurs at step 214, a second alarm is similarly broadcast, but the LED alarm is still not illuminated. Upon occurrence of a third fill failure at step 214, a third alarm is broadcast and the LED alarm illuminates to indicate that the system 10 will no longer attempt to fill during that particular run cycle. In this case, a local operator cognizant of the alarm can troubleshoot the system, and a subsequent stopping and restarting of engine 34 will clear the alarm and enable normal operation.

In another embodiment, in lieu of, or prior to conducting a validation routine, controller 26 may execute a different routine that first determines the make or model (or both) of engine 34. This may be accomplished by issuing a query to ECM 40 via public CAN Bus 25, to read data indicative of engine make and model. Alternatively, the make and model may be manually entered by an operator, for example, via port 29 by selecting from a menu of choices that each represent a particular make and model, or class, of engine. The routine can then match the particular engine make, model, and/or class to a known volume that corresponds to the onboard DEF tank of that particular engine, e.g. by consulting a lookup table.

Figure 3:
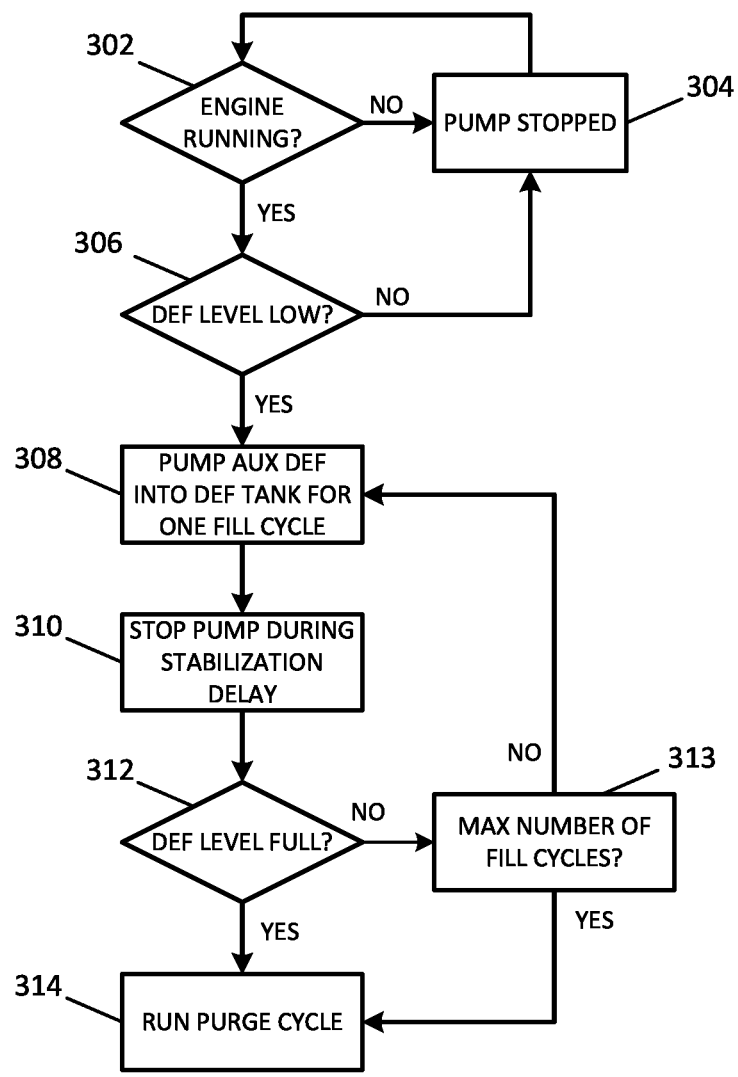
FIG. 3 is a flow chart of one embodiment of a process for normal operation of an auxiliary DEF supply system according to the invention.

FIG. 3 shows a flow chart of one embodiment of a process 300 for normal operation of an auxiliary DEF supply system 10 according to the invention as described in the foregoing paragraphs. Normal operation is a condition in which system 10 runs automatically without faults or errors and periodically delivers auxiliary supplies of DEF 22 to replenish an onboard DEF tank 32 of a diesel engine system 30 that is also running without experiencing faults or errors that would cause a system malfunction.

During normal operation of system 10, in decision step 302 the controller 26 periodically reads signals from ECM 40 indicative of whether the diesel engine 34 is running. If the engine is not running, the process advances to step 304 in which controller 26 maintains the pump 16 in a stopped or deenergized condition. From step 304 the process will periodically loop back to decision step 302 to assess whether there has been any change in the state of the diesel engine. If the diesel engine is running, the process advances to decision step 306 to determine whether a low level DEF signal is being broadcast from ECM 40. If not, then the controller again maintains the pump 16 in a deenergized condition at step 304 and the process loops again to step 302, to periodically monitoring engine state, and possibly again to step 306 to monitor DEF level in the onboard DEF tank 32.

If the controller 26 reads a low level DEF signal at step 306, the process advances to step 308. At this stage the controller 26 energizes pump 16 for the duration of a single fill cycle, to pump a minimum volume of DEF 22 into the onboard DEF tank 32. Next, at step 310, the controller 26 stops the pump for the duration of a stabilization delay, to allow DEF level in the onboard DEF tank 32 to stabilize. Next, at decision step 312, the controller reads data from ECM 40 to determine whether a high level DEF signal is being broadcast. If not, the process advances to step 313, to determine whether a maximum number of fill cycles has been reached. If not, the process loops back to step 308 for another fill cycle. If, however, the controller 26 at step 313 determines that a maximum number of fill cycles has been reached, the process advances to step 314 to run a purge cycle. If, at step 312, the controller reads a high level DEF signal, then the process advances to step 314 to run a purge cycle.

Figure 4:
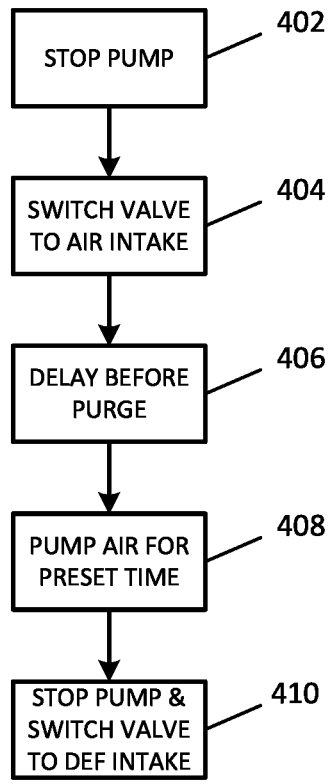
FIG. 4 is a flow chart of one embodiment of a purge cycle executable by an auxiliary DEF supply system according to the invention.

FIG. 4 shows a flow chart of one embodiment of a purge cycle 400 executable by an auxiliary DEF supply system 10 according to the invention as described in the foregoing paragraphs. The controller 26, upon receiving an indication of a system condition requiring a purge of auxiliary DEF supply line 14, such as the onboard DEF tank 32 becoming full as in event 314 in process 300, may execute all or a portion of the steps of purge cycle 400. The purge cycle begins at step 402, in which the controller 26 stops, or deenergizes the pump 16. Next, at step 404, the controller 26 switches the three-way valve 20 to its second state wherein ambient air is presented at pump inlet 24. The next step 406 is an optional step, in which a time delay, e.g. one second, is enforced by the controller 26 to ensure actuation of valve 20 before actuation of pump 16. Next, at step 408, the controller 26 energizes the pump 16 for a predetermined, programmable run-time period, e.g. 60 seconds, to ensure that all residual DEF 22 is forced out of the auxiliary DEF supply line 14 and into the onboard DEF tank 32. The final step 410 occurs at the end of the run-time period. In step 410, the controller 26 stops the pump 16 and deenergizes valve 20 so that it reverts to the first state.

Figure 5:
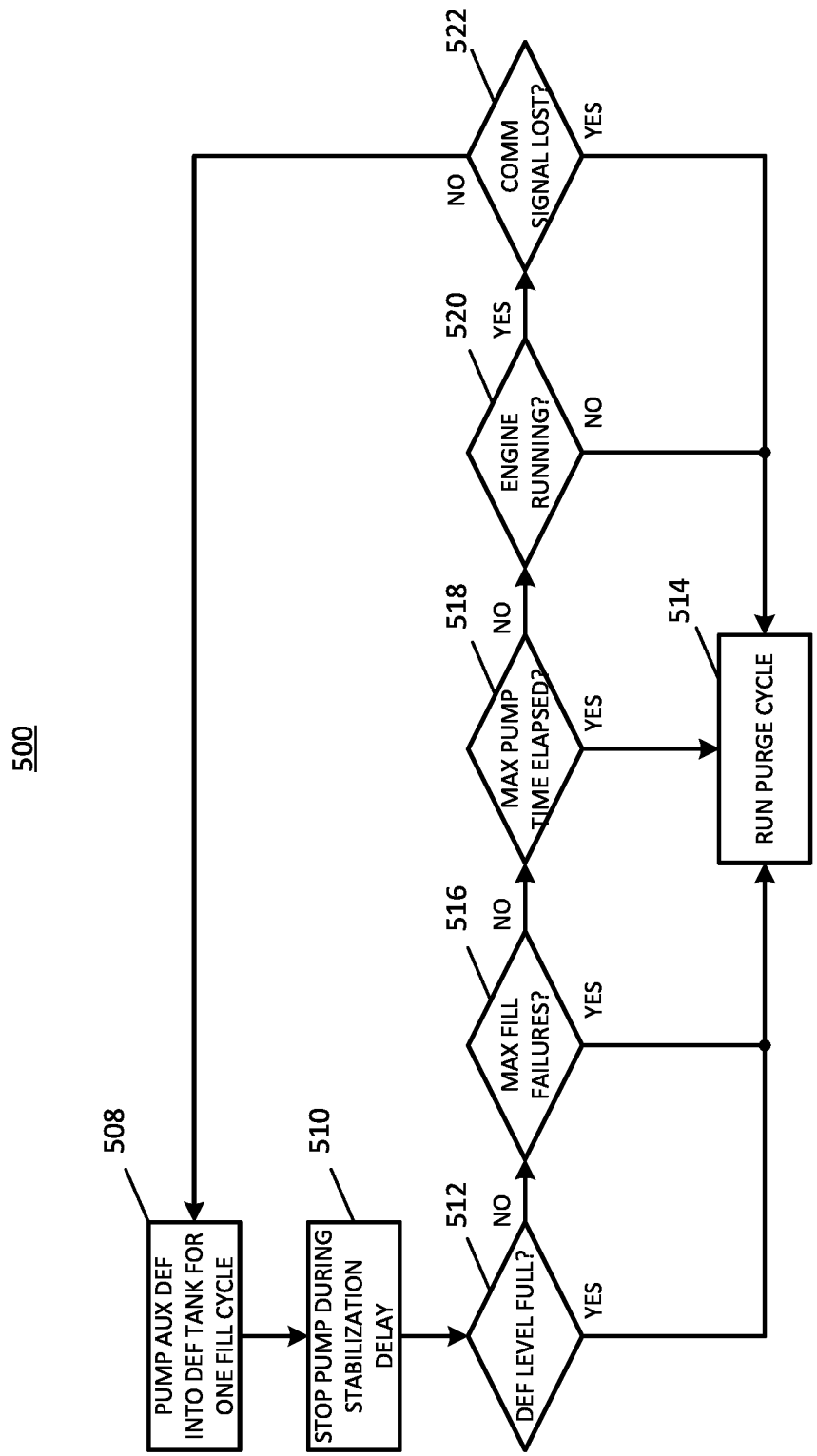
FIG. 5 is a flow chart of one embodiment of a process executable by an auxiliary DEF supply system according to the invention for monitoring diesel engine conditions that are capable of triggering a purge cycle.

FIG. 5 is a flow chart of one embodiment of a process 500 executable by an auxiliary DEF supply system 10 according to the present invention for monitoring multiple diesel engine conditions that are capable of triggering a purge cycle 400. Process 500 is a model of system operation that expands on the normal operation process 300 to illustrate how the controller of system 10 is configured to monitor for multiple events the occurrence of any one of which can cause system 10 to change mode from normal operation to a purge cycle. Steps 508, 510, 512, and 514 are functionally identical to steps 308, 310, 312, and 314, respectively. Steps 516, 518, 520, and 522 are decision steps during which the controller 26, while monitoring onboard DEF tank level at step 512, also monitors for other purge cycle events. For example, if at decision step 512, DEF level is determined not to be full, the controller at decision step 516 also monitors the system for a maximum number of fill failure, such as a validation failure in step 218. If a maximum number of fill failures (e.g. three) is detected, the system runs the purge cycle at step 514. If no fill failure is detected, the controller at decision step 518 determines whether a predetermined maximum pump run time has elapsed. If so, the system runs the purge cycle at step 514. If the maximum pump run time has not elapsed, the controller at decision step 520 checks whether the diesel engine 34 is running. If not, the system runs the purge cycle at step 514. If the engine is running, the controller at decision step 522 determines whether the communication link with ECM 40 has been lost. If so, the system runs the purge cycle at step 514. Otherwise, process 500 loops back to step 508 to resume normal operation. Those skilled in the art will recognize that fault signals or system conditions other than those illustrated in process 500 may be monitored by system 10 for purposes of determining, in similar fashion, the operating mode of the system.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for supplying diesel exhaust fluid (DEF) to an onboard DEF tank, comprising:
   an auxiliary DEF tank having an onboard microprocessor-based controller;
   an auxiliary DEF supply line configured for fluid communication between the auxiliary DEF tank and the onboard DEF tank;
   a pump having a pump inlet and configured to force fluid from the pump inlet through the auxiliary DEF supply line;
   an air inlet;
   a three-way valve configured to switch between a first state which couples the auxiliary DEF tank to the pump inlet, and a second state which couples the air inlet to the pump inlet; and
   wherein the controller is configured to execute a routine encoded in software for determining a failure in the system, wherein the routine comprises the following steps:
   (a) receiving a low DEF level signal from an engine control module of a diesel engine;
   (b) running the pump for one fill cycle;

(c) after completion of the fill cycle, automatically pausing the system for a predetermined amount of time, wherein the predetermined amount of time the system is paused is sufficient to allow DEF delivered to the onboard DEF tank to stabilize in the onboard DEF tank;
(d) reading an updated stabilized DEF level signal from the engine control module and comparing the updated stabilized signal to a validation point;
(e) if the updated stabilized DEF level signal fails the comparison to the validation point, determining whether a maximum number of similar failures have occurred; and
(f) if the maximum number of similar failures has occurred, stopping the pump.

2. The system of claim 1, wherein the pump comprises a positive displacement pump.

3. The system of claim 1, further comprising a portable enclosure, wherein the controller is configured for communicating via CAN bus protocol, and wherein the portable enclosure contains the controller, the auxiliary DEF tank, the pump, the air inlet, the three-way valve, and at least part of the auxiliary DEF supply line.

4. The system of claim 3, wherein the enclosure further comprises means for cooling contents of the auxiliary DEF tank.

5. The system of claim 1, wherein the controller is electrically coupled to the pump and to the three-way valve and configured to receive a purge signal; and
wherein the controller, in response to receiving the purge signal, commands the three-way valve to switch to the second state, and commands the pump to run for a predetermined time period after receiving the purge signal.

6. The system of claim 5, wherein the controller, in response to receiving the purge signal, commands the three-way valve to switch to the first state after the time period has lapsed.

7. The system of claim 5, wherein the purge signal represents an off state of a diesel engine.

8. The system of claim 5, wherein the purge signal represents a shutdown command for a diesel engine.

9. The system of claim 5, wherein the purge signal represents high DEF level in the onboard DEF tank.

10. The system of claim 5, wherein the purge signal is received by the controller via CAN bus protocol.

11. The system of claim 5, wherein the predetermined time period is sufficient to allow the pump to displace the DEF in the auxiliary DEF supply line with air.

12. The system of claim 1, wherein the three-way valve when non-energized remains in the first state.

13. The system of claim 12, wherein the controller is electrically coupled to the pump and configured to command the pump to start in response to receiving a supply signal.

14. The system of claim 13, wherein the supply signal represents low DEF level in the onboard DEF tank.

15. The system of claim 14, wherein the supply signal is received by the controller via CAN bus protocol.

16. An autonomous auxiliary diesel exhaust fluid (DEF) supply system for supplying DEF to an onboard DEF tank in a diesel engine, comprising:
an auxiliary DEF tank;
an auxiliary DEF supply line configured for fluid communication between the auxiliary DEF tank and the onboard DEF tank;
a pump configured to force DEF through the auxiliary DEF supply line; and
a controller electrically coupled to the pump;
wherein the controller is configured to command the pump responsive to DEF level signals received from an engine control module of the diesel engine; and
wherein the controller is configured to execute a routine encoded in software for automatically running a purge cycle, wherein the routine executed by the controller comprises:
running the pump for one fill cycle;
automatically pausing the system for a predetermined amount of time after completion of the fill cycle, wherein the predetermined amount of time the system is paused is sufficient for DEF delivered to the onboard DEF tank to stabilize in the onboard DEF tank;
reading an updated stabilized DEF level signal from the engine control module;
if the updated stabilized DEF level signal indicates that the DEF tank is not full, determining whether the pump has a run a maximum number of fill cycles; and
running a purge cycle if the pump has run the maximum number of fill cycles or if the updated stabilized DEF level signal indicates that the DEF tank is full.

17. The system of claim 16, wherein the DEF level signals are generated according to CAN bus protocol.

18. The system of claim 16, wherein the controller further comprises a second routine encoded in software for calculating onboard DEF tank volume, the controller configured to execute the second routine for calculating the onboard DEF tank volume.

19. An autonomous auxiliary diesel exhaust fluid (DEF) supply system for supplying DEF to an onboard DEF tank in a diesel engine, comprising:
an auxiliary DEF tank;
an auxiliary DEF supply line configured to fluid communication between the auxiliary DEF tank and the onboard DEF tank;
a pump configured to force DEF through the auxiliary DEF supply line; and
a controller electrically coupled to the pump; wherein the controller is configured to command the pump responsive to DEF level signals received from an engine control module of the diesel engine; and wherein the controller is configured to execute a first routine and a second routine, each routine encoded in software;
wherein the first routine executable by the controller comprises:
running the pump for one fill cycle;
automatically pausing the system for a predetermined amount of time after completion of the fill cycle, wherein the predetermined amount of time the system is paused is sufficient for DEF delivered to the onboard DEF tank to stabilize;
reading an updated stabilized DEF level signal from the engine control module;
if the updated stabilized DEF level signal indicates that the DEF tank is not full, determining whether the pump has a run a maximum number of fill cycles; and
running a purge cycle if the pump has run the maximum number of fill cycles or if the updated stabilized DEF level signal indicates that the DEF tank is full; and
wherein the second routine executable by the controller comprises:
receiving a low DEF level signal from the engine control module that indicates a low level of DEF in the onboard DEF tank;

running the pump for a single fill cycle selected to deliver to the onboard DEF tank a volume of DEF that is less than a total volume of the onboard DEF tank;

receiving an actual DEF level signal from the engine control module that indicates a higher level of DEF in the onboard DEF tank; and calculating the total volume of the onboard DEF tank based on the low level of DEF, the delivered volume of DEF, and the higher level of DEF.

20. The system of claim 19, wherein the second routine executed by the controller further comprises:

determining a number of the fill cycles that will deliver a maximum volume of DEF to the onboard DEF tank without exceeding the total volume.

* * * * *